(12) United States Patent
Karlsson

(10) Patent No.: US 10,810,194 B2
(45) Date of Patent: Oct. 20, 2020

(54) METHOD AND A NETWORK NODE IN A COMMUNICATION NETWORK FOR CORRELATING INFORMATION OF A FIRST NETWORK DOMAIN WITH INFORMATION OF A SECOND NETWORK DOMAIN

(71) Applicant: Telefonaktiebolaget L M Ericsson (publ), Stockholm (SE)

(72) Inventor: Pär Karlsson, Karlskrona (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 709 days.

(21) Appl. No.: 14/900,013

(22) PCT Filed: Jun. 20, 2013

(86) PCT No.: PCT/SE2013/050739
§ 371 (c)(1),
(2) Date: Dec. 18, 2015

(87) PCT Pub. No.: WO2014/204368
PCT Pub. Date: Dec. 24, 2014

(65) Prior Publication Data
US 2016/0140169 A1    May 19, 2016

(51) Int. Cl.
*G06F 16/245*    (2019.01)
*G06F 16/22*    (2019.01)
(Continued)

(52) U.S. Cl.
CPC ........... *G06F 16/245* (2019.01); *G06F 16/22* (2019.01); *H04L 67/22* (2013.01); *H04W 4/023* (2013.01);
(Continued)

(58) Field of Classification Search
CPC .............. H04L 2463/082; H04L 67/22; G06F 2221/2111; G06F 16/245; G06F 16/22;
(Continued)

(56) References Cited

U.S. PATENT DOCUMENTS 9,075,979 B1 * 7/2015 Queru .................... G06F 21/34
2011/0202466 A1 * 8/2011 Carter ................... G06Q 20/20
705/67
(Continued)

OTHER PUBLICATIONS

Malhotra, Anshu, et al. "Studying user footprints in different online social networks."; Proceedings of the 2012 International Conference on Advances in Social Networks Analysis and Mining (ASONAM 2012). IEEE Computer Society, 2012. (Year: 2012).*

*Primary Examiner* — Jesse P Frumkin
(74) *Attorney, Agent, or Firm* — Murphy, Bilak & Homiller, PLLC

(57) ABSTRACT

Disclosed is a method performed by a network node (300) in a communication network for correlating information of a first network domain (310) with information of a second network domain (320), the second network domain being different from the first network domain. The method comprises receiving (102) event information of a first event that occurred in the first network domain and receiving (104) event information of a second event that occurred in the second network domain, wherein the event information of the first event and the event information of the second event each comprises a user ID, UID; a time stamp, and a geographical information. The method further comprises comparing (106) the event information of the first event with
(Continued)

the event information of the second event in order to find a correlation between the event information of the first event and the event information of the second event, the correlation indicating a possible association between the UID of the first event and the UID of the second event.

24 Claims, 3 Drawing Sheets

(51) Int. Cl.
    *H04L 29/08*     (2006.01)
    *H04W 4/02*     (2018.01)
    *H04W 4/18*     (2009.01)
    *H04L 29/12*     (2006.01)

(52) U.S. Cl.
    CPC ..... *H04W 4/185* (2013.01); *G06F 2221/2111* (2013.01); *H04L 61/106* (2013.01)

(58) Field of Classification Search
    CPC ....... H04W 4/023; H04W 4/04; H04W 4/043; H04W 4/046
    USPC ........................................................ 707/758
    See application file for complete search history.

(56) References Cited

U.S. PATENT DOCUMENTS

| | | | |
|---|---|---|---|
| 2011/0321129 A1* | 12/2011 | Kinsel ................. | G06F 16/9535 726/4 |
| 2012/0041939 A1* | 2/2012 | Amsterdamski .... | G06F 16/9535 707/709 |
| 2012/0271860 A1 | 10/2012 | Graham, Jr. et al. | |
| 2013/0054433 A1* | 2/2013 | Giard ..................... | H04L 67/22 705/34 |
| 2013/0055346 A1* | 2/2013 | Singh ..................... | G06F 21/34 726/3 |
| 2013/0275438 A1* | 10/2013 | Ajmera ................. | G06Q 50/01 707/748 |
| 2014/0222928 A1* | 8/2014 | Scholtes ............... | H04L 51/046 709/206 |
| 2014/0280592 A1* | 9/2014 | Zafarani ................ | H04L 67/22 709/204 |
| 2015/0234913 A1* | 8/2015 | Mai ................... | G06F 17/30598 707/734 |
| 2019/0370859 A1* | 12/2019 | Traasdahl .............. | G06Q 30/02 |

\* cited by examiner

METHOD AND A NETWORK NODE IN A COMMUNICATION NETWORK FOR CORRELATING INFORMATION OF A FIRST NETWORK DOMAIN WITH INFORMATION OF A SECOND NETWORK DOMAIN

TECHNICAL FIELD

The present disclosure relates generally to a method performed by a network node in a communication network for correlating information of a first network domain with information of a second network domain. The present disclosure further relates to a corresponding network node, a computer program and a computer program product.

BACKGROUND

In the community of today, a person may communicate using different communication services, such as a regular telephone call, short message service, SMS, an Internet based services such as Facebook or Twitter etc. The person, also called user, may have different user IDs, UIDs, in the different services, for example, the user may have a telephone number at the operator of a mobile communication network and a user name in Facebook. For a service provider of a communication service it may be of interest to have much information of the user of its services to be able to provide the user with information that may be of interest for the user, such as information of other services that may be of interest for the user. Also, for the service provider it may be of interest to know how groups of users are behaving in a communication network to provide better service.

The UID used by the user consuming Internet services is typically not known to the operator of a telecommunication network, and vice versa. Thus there does not exist a link between identities in the different communication domains, e.g. twitter addresses and mobile phone numbers. Establishing such links can be very useful, making use of information from both the Internet and the mobile communication domain, and can allow new and improved services, improved customer support, fraud identification, etc.

A feature provided in a network today concerns the user being asked to provide a link between e.g. her email address and her mobile phone number, by for example providing the email address (and the phone number) during a registration procedure. Open ID is a standardized way of correlating between UIDs, which allows users opting in to provide correlation information between their UIDs, such as informing of their email address and their telephone number. As mentioned, this feature relies on the user informing the network of its two UIDs. It is not very many users that take the opportunity to actively provide their UIDs Consequently, to get more knowledge about users of a communication network there is a need for a way to link different UIDs used in different network domains, UIDs that belong to the same user, without needing an active input from the user.

SUMMARY

It is an object of the invention to address at least some of the problems and issues outlined above. Further, it is an object of the invention to make it possible for operators to get more knowledge about users of their networks in order to provide the users with better services. Another object is to link UIDs that have some kind of association to each other, such as belonging to the same user, and that are used in different network domains, such as in a mobile communications network and an Internet domain, e.g. Facebook.

It is possible to achieve these objects and others by using a method and an apparatus as defined in the attached independent claims.

According to one aspect, a method is provided performed by a network node in a communication network for correlating information of a first network domain with information of a second network domain, the second network domain being different from the first network domain. The method comprises receiving event information of a first event that occurred in the first network domain and receiving event information of a second event that occurred in the second network domain, wherein the event information of the first event and the event information of the second event each comprises a UID, a time stamp, and a geographical information. The method further comprises comparing the event information of the first event with the event information of the second event in order to find a correlation between the event information of the first event and the event information of the second event, the correlation indicating a possible association between the UID of the first event and the UID of the second event.

According to a second aspect, a network node is provided in a communication network configured for correlating information of a first network domain with information of a second network domain, the second network domain being different from the first network domain. The network node comprises a receiving unit for receiving event information of a first event that occurred in the first network domain, and for receiving event information of a second event that occurred in the second network domain, wherein the event information of the first event and the event information of the second event each comprises a user ID, a time stamp, and a geographical information. The network node further comprises a comparing unit for comparing the event information of the first event with the event information of the second event in order to find a correlation between the event information of the first event and the event information of the second event, the correlation indicating a possible association between the UID of the first event and the UID of the second event.

According to a third aspect a computer program is provided comprising computer readable code means, arranged to run in a network node in a communication network. The network node is configured for correlating information of a first network domain with information of a second network domain. The computer readable code means causes the network node to perform the following steps: receiving event information of a first event that occurred in the first network domain; receiving event information of a second event that occurred in the second network domain, wherein the event information of the first event and the event information of the second event each comprises a user ID, UID; a time stamp, and a geographical information; and comparing the event information of the first event with the event information of the second event in order to find a correlation between the event information of the first event and the event information of the second event, the correlation indicating a possible association between the UID of the first event and the UID of the second event.

The above method and apparatus may be configured and implemented according to different optional embodiments. Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to link UIDs used in different network domains to each other, UIDs that are related to each other, but which relation each separate network domain does not know about. This is achieved by comparing events occurring in a first network domain, e.g. Facebook with events occurring in a second network domain, e.g. a mobile communication network. Each event comprises a UID, a time stamp and a geographical information. If an event occurring in the first network domain has for example similar time stamp and similar geographical information as an event occurring in a second network domain, these two events may be associated. This indicates that a correlation has been found between the UIDs of the two network domains, the correlation indicating a possible association between the UIDs. Further, a probability value may be set to the found correlation. If more such correlated events are found for the same UIDs the probability value increases for this correlation. If the probability values increases over a threshold value, it is determined that a link has been identified between the two UIDs. The link may be that the two UIDs belong to the same user.

Figure 1:
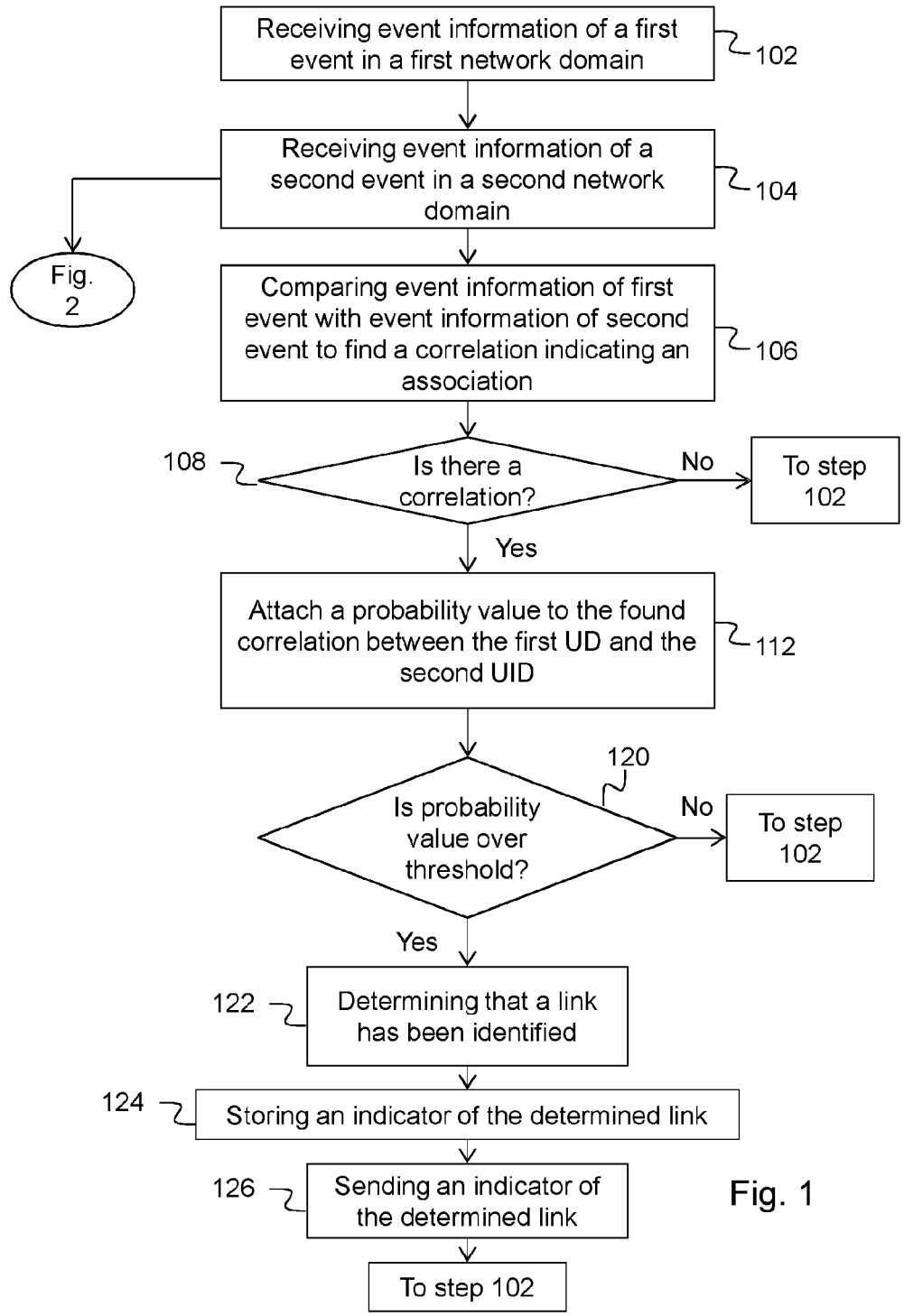
FIG. 1 is a flow chart illustrating methods according to possible embodiments.
Figure 3:
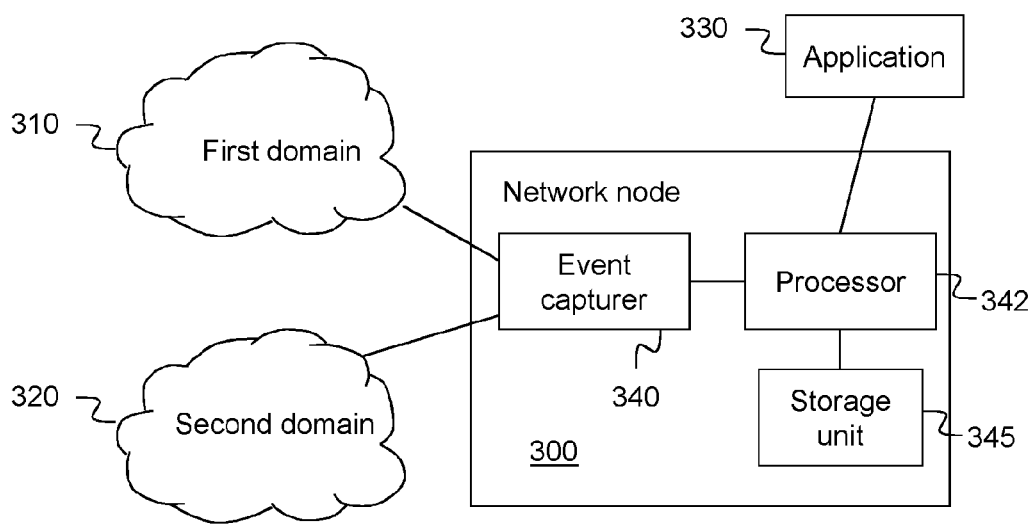
FIG. 3 is a schematic block diagram of a communication network comprising a network node according to a possible embodiment.

According to an embodiment shown in FIG. 1, also with reference to FIG. 3, a method is provided performed by a network node 300 in a communication network for correlating information of a first network domain 310 with information of a second network domain 320. The second network domain 320 is different from the first network domain. The method comprises receiving 102 event information of a first event that occurred in the first network domain, and receiving 104 event information of a second event that occurred in the second network domain. The event information of the first event and the event information of the second event each comprise a UID; a time stamp, and a geographical information. The method further comprises comparing 106 the event information of the first event with the event information of the second event in order to find a correlation between the event information of the first event and the event information of the second event. The correlation indicates a possible association between the UID of the first event and the UID of the second event.

A network domain is a communication network portion or a service in a communication network. A network domain may for example be an Internet communication service such as Twitter or Facebook or a mobile communication network service such as SMS. That the first network domain is different from the second network domain means in this application that a first UID is used in the first network domain and a second UID is used in the second network domain and that a possible connection between the first UID and the second UID is not known in the respective first or second network domain.

An event is a communication event occurring in the network domain. The communication event may be e.g. setting up a telephone call between two (or more) users, sending a message from a first user to a second user, or a user updating information on Facebook etc. In case the communication event considers two or more involved users, the UIDs for which an association is to be found may be either the user initiating the event or the user receiving the event. Alternatively, it may relate to both the event-initiating user and the event-receiving user. The event information of each event comprises a UID; a time stamp, and a geographical information. A time stamp is a time when the event occurred. Geographical information is information of where the user was situated geographically when the event occurred. The event information may be a call detail record when the event was a regular telephone call, and twitter tweet information when the event was a user tweeting on twitter. A first event is an event occurring in the first network domain. A second event is an event occurring in the second network domain.

A correlation between the event information of the first event and the event information of the second event means that the events are correlated in time and/or place. For example, it may be that the first event occurred at a similar time and place as the second event, i.e. that the time stamp of the first event is similar to the time stamp of the second event, and that the geographical information of the first event is similar to the geographical information of the second event.

When a plurality of first events and a plurality of second events are received and compared, it may be the case that a number of correlations have been found for the first UID and the second UID. The correlations may indicate that the first UID and the second UID are linked.

Such a method may detect correlated UIDs from two different network domains. The correlation or association between the two UIDs may be that they belong to the same user. Such a correlation could be used to better adapt services provided to the user. For example, if the operator of a mobile communication network knows that a user of his network domain also uses twitter a lot, he may provide the user with services adapted to twitter users as well as to the behavior of the user at the mobile communication network domain. The method may also be used to strengthen assertions on identifier links established via another more explicit mechanism, such as OpenId.

According to an embodiment, the possible association may indicate that the UID of the first event and the UID of the second event relates to the same user. That the possible association indicates that the UID of the first event and the UID of the second event relates to the same user comprises that the user may use different user equipments to communicate at the first network domain and at the second network domain, or that the user uses the same user equipment for communication in both domains. A user may be e.g. a person or a machine.

According to another embodiment, the possible association indicates that the UID of the first event and the UID of the second event relates to different user equipments arranged at the same carrier means. A carrier means may be e.g. a vehicle or a dwelling house. Thereby, users belonging to e.g. the same family may be identified.

According to another embodiment, also shown in FIG. 1, when a correlation is found 108, a probability value is attached 112 to the found correlation between the UID of the first event and the UID of the second event. The probability value indicates a probability that there is an association between the UID of the first event and the UID of the second event. Thereby it is possible to set different probability values to the found correlation depending on how strong the correlation is, i.e. how probable it is that the UID of the first event and the UID of the second event is linked. If there is no correlation found, the method is repeated with the first receiving step 102.

According to another embodiment, when the found correlation is new, an initial probability value is attached to the found correlation. The found correlation may also be stored together with the initial probability value. Further, when the found correlation is already stored, the probability value of the stored correlation is adjusted. This may signify that when this is the first time a correlation between a first UID in the first network domain and a second UID in the second network domain is found, an initial probability value is set. If, on the other hand, after repeated comparing of event information in step 106, this is the second or third time etc. that a correlation is found between the first UID and the second UID, the probability value of the stored correlation is increased. Thereby, the probability that the UIDs are linked may be quantified even further.

According to another embodiment, when the correlation has been stored and no new correlation has been found for the first UID and the second UID within a defined time period, the probability value is adjusted to a lower value. If for an identified possible association between the first ID and the second ID, there is no more correlation found within a certain time period, either confirming or denying an association between the UIDs, this may be interpreted as an indication of a non-correlation, thereby lowering the probability that a link has been found.

According to another embodiment, also shown in FIG. 3, the method may further comprise determining 122 that there is a link between the UID of the first event and the UID of the second event when the probability value of the found correlation is 120 over a probability threshold. After a plurality of correlations has been found, the probability value may have risen to a certain level where it is very probable that the UIDs are actually linked. This level may be defined as a probability threshold. The threshold may be pre-defined.

According to another embodiment, the method may further comprise storing 124 an indicator of the determined link between the UID of the first event and the UID of the second event.

According to another embodiment, the method may further comprise sending 126 an indicator of the determined link between the UID of the first event and the UID of the second event to an application 330, see FIG. 3. The application may be an application using UIDs to send information to users, which application would benefit from knowing about a link between two UIDs of two different network domains, for example that the UIDs belong to the same user. This way such an application is informed of a link between the two user-IDs. Thereafter, the method may be repeated for other events in the first and the second network.

According to another embodiment, a correlation is found between the event information of the first event and the event information of the second event when the time stamp of the first event and the time stamp of the second event are within a certain time period. According to another embodiment, a correlation is found between the event information of the first event and the event information of the second event when the geographical information of the first event and the geographical information of the second event are within a certain geographical distance. Geographical information and time stamp information may also be combined, i.e. that a correlation is found if both time stamp and geographical information for the two events are within the defined margins.

According to another embodiment, the method may further comprise normalizing the received event information such the event information of the first event and the event information of the second event are comparable. It may be necessary to normalize event information from different network domains since they may be in different formats that cannot be compared as such, e.g. cell-ID in a mobile communication network and long/lat information in Facebook.

According to another embodiment, the comparison 106 between the event information of the first event and the event information of the second event may be performed only if the first event and the second event occurred within a defined time span or if the first event and the second event occurred within a defined geographical distance from each other. This time span and geographical distance is preferably larger than the time span and geographical distance for which a correlation indicating an association between the first UID and the second UID is found. By such an embodiment, the number of events to compare is limited. Thereby, computer resources and network resources are saved.

Figure 2:
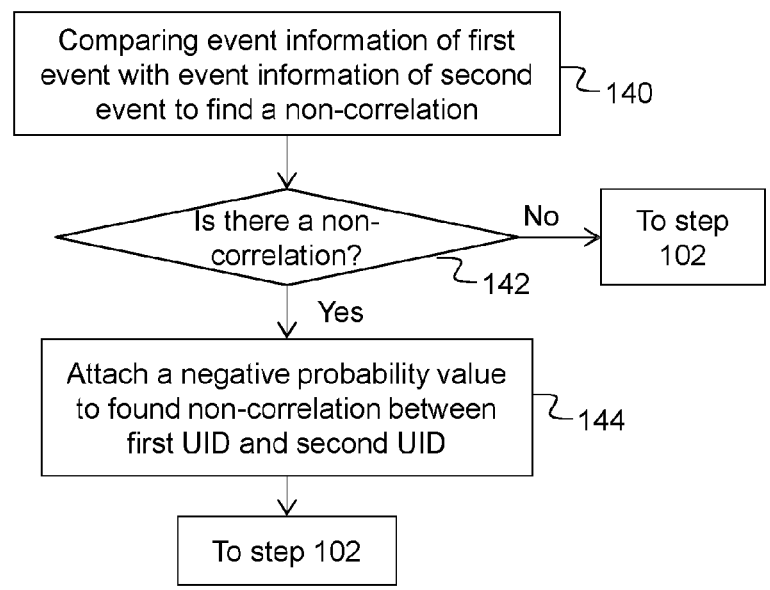
FIG. 2 is a flow chart illustrating a method according to another possible embodiment.

FIG. 2 shows another embodiment of the method. After the event information from the first and the second networks are received in steps 102 and 104, the method may comprise comparing 140 the event information of the first event with the event information of the second event in order to find a non-correlation between the event information of the first event and the event information of the second event. The non-correlation indicates that the UID of the first event and the UID of the second event are not associated. An example of a non-correlation is that the first event and the second event are performed at substantially the same time but with a geographical information that indicates that they are far away, indicating that the UIDs of the first and the second event are not correlated, for example it is not probable that they belong to the same user. This may be useful to weed out non-correlated UIDs and to improve the reliability of found links.

According to another embodiment, the method may further comprise attaching 144 a negative probability value to the found non-correlation between the UID of the first event and the UID of the second event when a non-correlation is found 142. The negative probability value may indicate quantitatively that these UIDs are not linked. The method may be repeated with new first and second events after step 144 and also if there is no non-correlation found 142.

An embodiment of the invention is built on an idea to systematically correlate available information traces, even called events, from multiple network domains to establish links between identities in the different network domains. As an example of events, call detail records, CDRs, containing time and location information of telephone calls and data connections, and twitter tweets are considered. As both the CDRs and the twitter tweets contain UIDs, timestamps and geographical information, it is possible to build up links to determine a probability that the events in the different network domains (as described by CRDs and twitter tweets in this example) are coming from the same source (for example the same user). Multiple observations over time can be used to strengthen or weaken the probability. Even if the geographical correlation between geographical information of two events is rather weak, due to errors, large mobile network cell sizes, etc. one can infer stronger assertions from multiple observations. For example, if all tweets observed by twitter user X was done when MSISDN Y was nearby the probability is high that twitter user X is the same user as MSISDN Y.

FIG. 3 shows a schematic block diagram of a communication network comprising a first network domain 310 and a second network domain 320. The first network domain may be e.g. a mobile communication network and the second network domain may be e.g. an Internet communication service such as Twitter or Facebook. The first network domain 310 and the second network domain 320 are connected to a network node 300 for correlating information of the first network domain with information of the second network domain.

The network node 300 comprises an event capturer 340 for capturing event streams, i.e. a plurality of events, from the first domain 310 and the second domain 320. The events can be e.g. CDRs from a mobile communication network, tweets from twitter, updates from Facebook, images posted on the Internet, e.g. at Instagram. The network node 300 further comprises a processor 342. The processor 342 may be arranged to clean and normalize each event. The cleaning and normalizing process may perform any of the following procedures: removing erroneous data, filtering out unnecessary information and formatting data into a common format. The purpose of the cleaning and normalizing process is to make the data from the two network domains comparable. The processor 342 may further be arranged to compare events from the first domain with events from the second domain in order to find matching events or indications of non-matching events. The network node further comprises a storage unit 345. The storage unit 345 may be arranged to store information that is used as a part of the matching process. Such information may be intermediate information about correlations between events indicating a possible association between the UID of the first event and the UID of the second event. The possible association between the UIDs may be stored as a potential link until the potential link is confirmed or refuted. A probability value may be attached to the possible association between the UIDs. The probability value indicates a probability that the UIDs are linked. When a new correlation is found between events indicating a possible association between UIDs that already have a stored possible association, the probability value increases. When the probability value has increased above a threshold, which may be predetermined, it is determined that there is a link between the UIDs. The link is then stored in the storage unit 345. Information of the link may also be sent to external nodes or applications 330 that may have use of such information. The information sent may be an indication of the UIDs and that the UIDs are linked, e.g. belongs to the same user. Alternatively, the applications 330 or external nodes may also access the stored information from the storage unit 345.

The event information received at the network node 300 from the first and second domains 310, 320 may comprise any or all of the following:

Identifier, e.g. UID—this may be provided in the shape of a free format field that may have a meaning only in the originating network domain, examples of identifiers include MSISDN, twitter ID, email address etc.

One or more time-stamps—a time stamp may indicate either a single point in time when an event occurred or a window of time during which some event took place, examples include when a tweet was issued, the start and stop time of a call etc.

Geographical information—geographical information may indicate a location point or geographical area in which the event occurred. It may be necessary to determine coordinates of an actual geographical area, from a symbolic reference provided by the event information. Such a symbolic reference may be e.g. a cell ID of a mobile communication domain. The determination may be performed in the network node.

In an ever ongoing stream of events it will be almost impossible to compare all events against each other. By using a windowing procedure the number of comparisons is decreased by grouping events together. The windowing procedure means that only events that may be grouped together within some type of window are compared. For example, a comparison between the event information of the first event and the event information of the second event is performed only if the first event and the second event occurred within a defined time span (a time window) or if the first event and the second event occurred within a defined geographical distance from each other (a geographical window). Within such groups a more detailed analysis can be afforded.

A straightforward example is to identify events originating from within a particular physical boundary and a particular period in time. However, it is also possible to think of other groupings, an example can be events within the same time-window, but separated physically. Such a group could be used to find evidence for non-matching identifiers. Another grouping may be events from the same geographical area but from a very long time-window. Users repeatedly appearing in such a group will likely have some sort of relation, even if their events do not match in time. Note that the examples above refer to known meaningful groupings. As an embodiment of the method, it will also be possible to run other algorithms at this stage to detect clustering based on patterns not known in design time. For example a k-nearest neighbor algorithm could be deployed. The k-nearest algorithm is as such well-known. For more information of the k-nearest algorithm, see en.wikipedia.org/wiki/K-nearest_neighbor_algorithm.

As mentioned, as part of the detailed analysis a probability for pairs of identifiers to be associated are continuously estimated. From found correlated events, the probability is increased, for example when concurrent events in the same geographical area are seen. When non-correlated events are found, the probability is decreased, for example if concurrent events are seen in disjoint areas. In a large network it may be difficult, or at least it may take up to much processor capacity and storage space to maintain storage of all pairs of identifiers. Therefore a set of "candidate UID links", i.e. possible associations between UIDs is maintained. This serves to filter out candidates UID links to target for closer monitoring by keeping track of the probabilities as described above. Particular patterns of events can be identified to serve as such suspicion markers, e.g. almost simultaneous events. However in order to not consistently failing in detecting a multiple by themselves low probability events a randomization may be introduced where sometimes pairs of UIDs are included in a candidate UID link set even from low probability events. Further, according to an embodiment, pairs of UIDs that remain in the candidate UID link set for an extended period of time without building up a significant probability is regularly evicted. As mentioned, when the estimated probability of a candidate UID link exceeds a specified threshold, it is determined that there is a link between the UIDs, and information of the link is stored and published, i.e. sent to applications that may be in need of such information.

Figure 4:
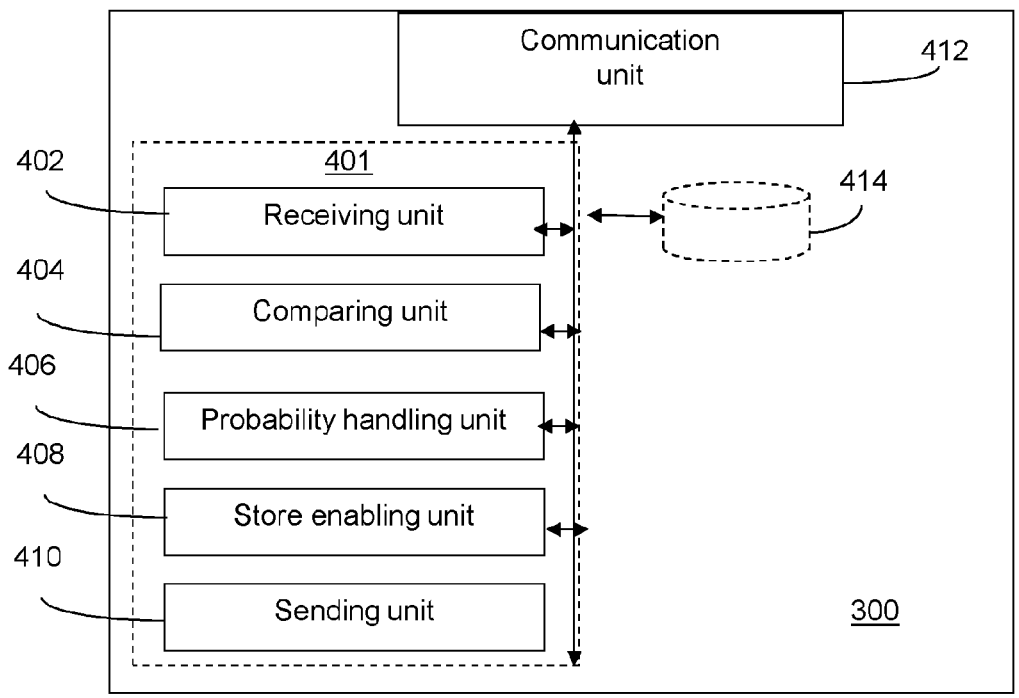
FIGS. 4-5 are schematic block diagrams of a network node according to further possible embodiments.

FIG. 4 describes a network node 300 in a communication network according to a possible embodiment. The network node 300 is configured for correlating information of a first network domain 310 with information of a second network domain 320. The second network domain is different from the first network domain. The network node comprises a receiving unit 402 for receiving event information of a first event that occurred in the first network domain, and for receiving event information of a second event that occurred in the second network domain, wherein the event information of the first event and the event information of the second event each comprises a user ID; a time stamp, and a geographical information. The network node further comprises a comparing unit 404 for comparing the event information of the first event with the event information of the second event in order to find a correlation between the event information of the first event and the event information of the second event, the correlation indicating a possible association between the UID of the first event and the UID of the second event. The network node 300 may further comprise a communication unit 412, which may be considered to comprise conventional means for communicating from and/or to the other nodes in the network, such as the first network domain 310 and the second network domain 320. The network node 300 may further comprise one or more storage units or memories 414.

According to another embodiment, the possible association indicates that the UID of the first event and the UID of the second event relates to the same user.

According to another embodiment, the network node 300 may further comprise a probability handling unit 406 for attaching a probability value to the found correlation between the UID of the first event and the UID of the second event when a correlation is found, the probability value indicating a probability that there is an association between the UID of the first event and the UID of the second event.

According to another embodiment, the probability handling unit 406 may further be arranged for attaching an initial probability value to the found correlation and storing the found correlation together with the initial probability value when the found correlation is new. The probability handling unit 406 may further be arranged for adjusting the probability value of the stored correlation when the found correlation is already stored.

According to another embodiment, the probability handling unit 406 may further be arranged for adjusting the probability value to a lower value when the correlation has been stored and no new correlation has been found for the first UID and the second UID within a defined time period.

According to another embodiment, the probability handling unit 406 is further arranged for determining that there is a link between the UID of the first event and the UID of the second event when the probability value of the found correlation is over a probability threshold.

According to another embodiment, the network node may further comprise a store enabling unit 408 for storing an indicator of the determined link between the UID of the first event and the UID of the second event.

According to another embodiment, the network node may further comprise a sending unit 410 for sending an indicator of the determined link between the UID of the first event and the UID of the second event to an application 330.

According to another embodiment, the comparing unit 404 is further arranged for comparing the event information of the first event with the event information of the second event in order to find a non-correlation between the event information of the first event and the event information of the second event, the non-correlation indicating that the UID of the first event and the UID of the second event are not associated.

The receiving unit 402, the comparing unit 404, the probability handling unit 406, the store enabling unit 408 and the sending unit 410 may be arranged in an arrangement 401. The arrangement 401 could be implemented e.g. by one or more of: a processor or a micro processor and adequate software and storage therefore, a Programmable Logic Device, PLD, or other electronic component(s)/processing circuit(s) configured to perform the actions, or methods, mentioned above.

Figure 5:
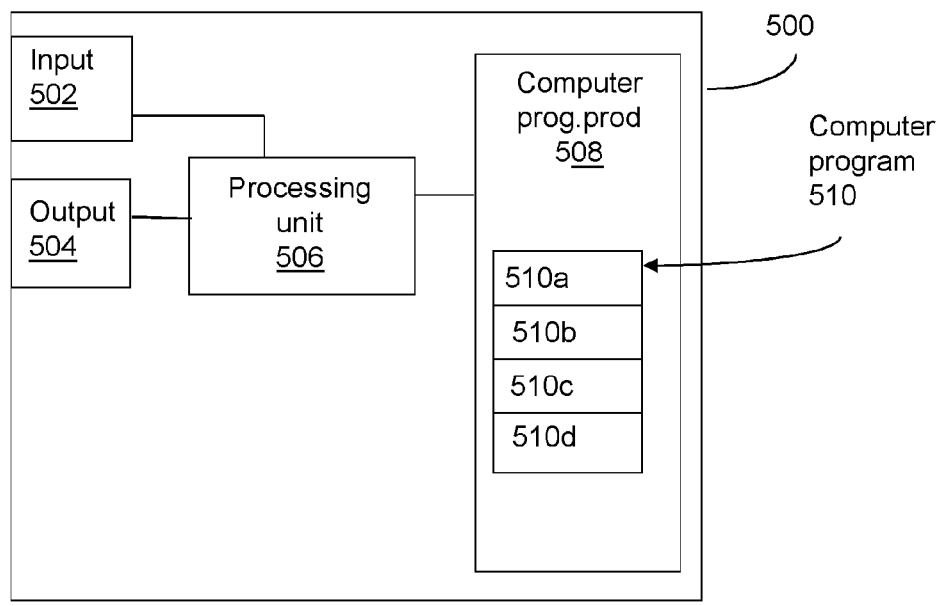

FIG. 5 schematically shows an embodiment of an arrangement 500 for use in a network node 300, which arrangement also can be an alternative way of implementing an embodiment of the arrangement 401 illustrated in FIG. 4. Comprised in the arrangement 500 is a processing unit 506, e.g. with a DSP (Digital Signal Processor) or a microprocessor. The processing unit 506 may be a single unit or a plurality of units to perform different actions of procedures described herein. The arrangement 500 may also comprise an input unit 502 for receiving signals from other entities, and an output unit 504 for providing signal(s) to other entities. The input unit 502 and the output unit 504 may be arranged as an integrated entity.

Furthermore, the arrangement 500 comprises at least one computer program product 508 in the form of a non-volatile or volatile memory, e.g. an EEPROM (Electrically Erasable Programmable Read-only Memory), a flash memory, a disk drive or a RAM (Random-access memory). The computer program product 508 comprises a computer program 510, which comprises code means, which when executed in the processing unit 506 in the arrangement 500 causes the arrangement to perform the actions of any of the procedures described earlier in conjunction with any of FIG. 1 or 2.

The computer program 510 may be configured as a computer program code structured in computer program modules. Hence, in an exemplifying embodiment, the code means in the computer program 510 of the arrangement 500 comprises a first receiving module 510a for receiving event information of a first event that occurred in the first network domain and a second receiving module 510b for receiving event information of a second event that occurred in the second network domain, wherein the event information of the first event and the event information of the second event each comprises a user ID, UID; a time stamp, and a geographical information. The code means in the computer program 510 further comprises a comparing module 510c for comparing the event information of the first event with the event information of the second event in order to find a correlation between the event information of the first event and the event information of the second event, the correlation indicating a possible association between the UID of the first event and the UID of the second event.

The processing unit 506 may be a single Central processing unit, CPU, but it could also comprise two or more processing units. For example, the processing unit may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM (Electrical Erasable Programmable ROM), and the computer program modules described above could in alternative embodiments be distributed on different computer program products in the form of memories within the network node.

Although the code means in the embodiments disclosed above in conjunction with FIG. 5 are implemented as computer program modules which when executed in the processing unit causes the apparatus to perform the actions described above in the conjunction with figures mentioned above, at least one of the code means may in alternative embodiments be implemented at least partly as hardware circuits.

The invention may provide the possibility to establish better knowledge about users of a communication network. The invention may further provide an up-to-date/continuously updated view of the "true" identity of users in the network. The invention may further provide one or more of the following: a base for better customer segmentation; targeted advertising opportunities; the possibility to identify VIP users present in the network; a way to avoid or complement self-registration procedures for external identifiers. When used as a compliment it can be used to validate or strengthen identity claims done by end-users.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby.

The invention claimed is:

1. A method performed by a network node in a communication network for correlating information of a first network domain with information of a second network domain, the second network domain being different from the first network domain, the method comprising:

receiving event information of a first event that occurred in the first network domain, the first network domain being a mobile communication network; and receiving event information of a second event that occurred in the second network domain, the second network domain being an Internet network domain;

wherein the event information of the first event and the event information of the second event each comprises a user ID (UID), a time stamp indicating a time when the respective event occurred, and a geographical information indicating where a user corresponding to the respective event was situated geographically when the respective event occurred, the UID of the first event differing from the UID of the second event, and wherein the method further comprises:

comparing the event information of the first event with the event information of the second event in order to find a correlation between the event information of the first event and the event information of the second event, such correlation indicating a possible association between the UID of the first event and the UID of the second event, wherein the possible association indicates that the UID of the first event and the UID of the second event relate to the same user; and comparing the event information of the first event with the event information of the second event in order to find a non-correlation between the event information of the first event and the event information of the second event, such non-correlation indicating that the UID of the first event and the UID of the second event are not associated.

2. The method of claim 1, wherein the possible association indicates that the UID of the first event and the UID of the second event relate to different user equipments arranged at the same carrier means.

3. The method of claim 1, further comprising:

in response to a correlation being found, attaching a probability value to the found correlation between the UID of the first event and the UID of the second event, the probability value indicating a probability that there is an association between the UID of the first event and the UID of the second event.

4. The method of claim 3, wherein when the found correlation is new, attaching an initial probability value to the found correlation and storing the found correlation together with the initial probability value, and when the found correlation is already stored, adjusting the probability value of the stored correlation.

5. The method of claim 4, further comprising:

when the correlation has been stored and no new correlation has been found for the first UID and the second UID within a defined time period, adjusting the probability value to a lower value.

6. The method of claim 3, further comprising:

when the probability value of the found correlation is over a probability threshold, determining that there is a link between the UID of the first event and the UID of the second event.

7. The method of claim 6, further comprising:

storing an indicator of the determined link between the UID of the first event and the UID of the second event.

8. The method of claim 6, further comprising:

sending an indicator of the determined link between the UID of the first event and the UID of the second event to an application.

9. The method of claim 1, wherein a correlation is found between the event information of the first event and the event information of the second event when the time stamp of the first event and the time stamp of the second event are within a certain time period.

10. The method of claim 1, wherein a correlation is found between the event information of the first event and the event information of the second event when the geographical information of the first event and the geographical information of the second event are within a certain geographical distance.

11. The method of claim 1, further comprising:
in response to a non-correlation being found, attaching a negative value to the found non- correlation between the UID of the first event and the UID of the second event.

12. The method of claim 1, further comprising:
normalizing the received event information such that the event information of the first event and the event information of the second event are comparable.

13. The method of claim 1, wherein the comparison between the event information of the first event and the event information of the second event is performed in response to determining that the first event and the second event occurred within a defined time span or that the first event and the second event occurred within a defined geographical distance from each other.

14. A network node in a communication network configured for correlating information of a first network domain with information of a second network domain, the second network domain being different from the first network domain, the network node comprising:
a receiving unit configured to receive event information of a first event that occurred in the first network domain and to receive event information of a second event that occurred in the second network domain, wherein the first network domain is a mobile communication network domain and the second network domain is an Internet network domain, and wherein the event information of the first event and the event information of the second event each comprise a user ID (UID), a time stamp indicating a time when the respective event occurred, and a geographical information indicating where a user corresponding to the respective event was situated geographically when the respective event occurred, the UID of the first event differing from the UID of the second event, and wherein;
a comparing unit for comparing the event information of the first event with the event information of the second event in order to find a correlation between the event information of the first event and the event information of the second event, such correlation indicating a possible association between the UID of the first event and the UID of the second event, wherein the possible association indicates that the UID of the first event and the UID of the second event relate to the same user, and for comparing the event information of the first event with the event information of the second event in order to find a non-correlation between the event information of the first event and the event information of the second event, such non-correlation indicating that the UID of the first event and the UID of the second event are not associated.

15. The network node of claim 14, further comprising a probability handling unit for attaching a probability value to the found correlation between the UID of the first event and the UID of the second event when a correlation is found, the probability value indicating a probability that there is an association between the UID of the first event and the UID of the second event.

16. The network node of claim 15, wherein the probability handling unit is further arranged for attaching an initial probability value to the found correlation and storing the found correlation together with the initial probability value when the found correlation is new, and for adjusting the probability value of the stored correlation when the found correlation is already stored.

17. The network node of claim 16, wherein the probability handling unit is further arranged for adjusting the probability value to a lower value when the correlation has been stored and no new correlation has been found for the first UID and the second UID within a defined time period.

18. The network node of claim 16, wherein the probability handling unit is further arranged for determining that there is a link between the UID of the first event and the UID of the second event when the probability value of the found correlation is over a probability threshold.

19. The network node of claim 18, further comprising a store enabling unit for storing an indicator of the determined link between the UID of the first event and the UID of the second event.

20. The network node of claim 18, further comprising a sending unit for sending an indicator of the determined link between the UID of the first event and the UID of the second event to an application.

21. A non-transitory computer-readable medium comprising, stored thereupon, a computer program comprising computer program code configured so that when the computer program code is run in a network node in a communication network the computer program code configures the network node to correlate information of a first network domain with information of a second network domain by:
receiving event information of a first event that occurred in the first network domain and receiving event information of a second event that occurred in the second network domain, wherein the first network domain is a mobile communication network domain and the second network domain is an Internet network domain, and wherein the event information of the first event and the event information of the second event each comprises a user ID (UID), a time stamp indicating a time when the respective event occurred, and a geographical information indicating where a user corresponding to the respective event was situated geographically when the respective event occurred, the UID of the first event differing from the UID of the second event, and wherein;
comparing the event information of the first event with the event information of the second event in order to find a correlation between the event information of the first event and the event information of the second event, such correlation indicating a possible association between the UID of the first event and the UID of the second event, wherein the possible association indicates that the UID of the first event and the UID of the second event relate to the same user; and
comparing the event information of the first event with the event information of the second event in order to find a non-correlation between the event information of the first event and the event information of the second event, such non-correlation indicating that the UID of the first event and the UID of the second event are not associated.

22. The method of claim 1, wherein receiving the event information of the first event comprises receiving a call data record (CDR).

23. The network node of claim 14, wherein the receiving unit is configured to receive event information of the first event by receiving a call data record (CDR).

24. The non-transitory computer-readable medium of claim 21, wherein the program code is configured to cause the network node to receive event information of the first event by receiving a call data record (CDR).

\* \* \* \* \*